March 13, 1934. A. WILLINK 1,950,427
CONTROL SYSTEM FOR THE TRANSMISSION OF ANGULAR MOTION
Filed April 25, 1930 3 Sheets-Sheet 1
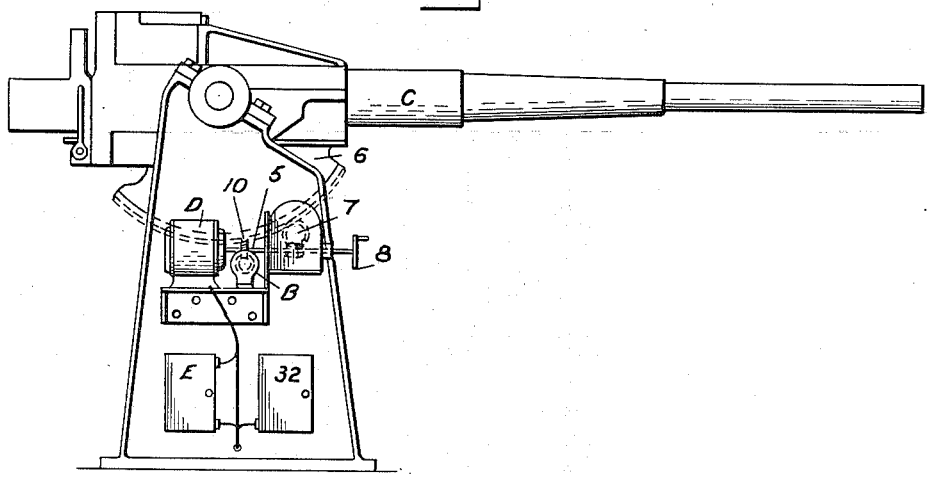
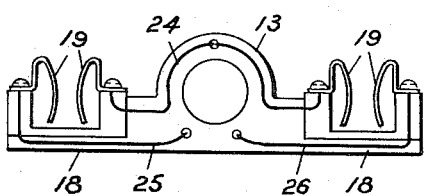
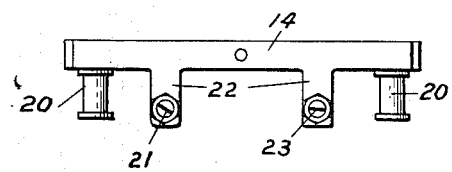
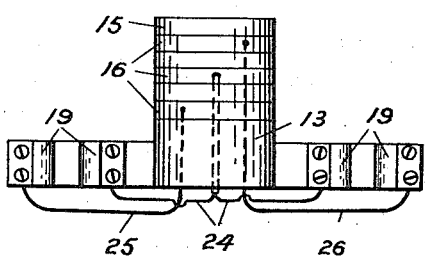
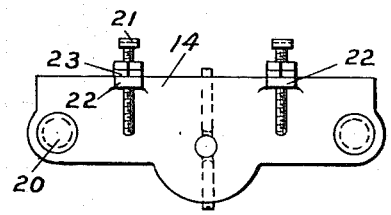
INVENTOR.
Arthur Willink
BY W. N. Roach
ATTORNEY

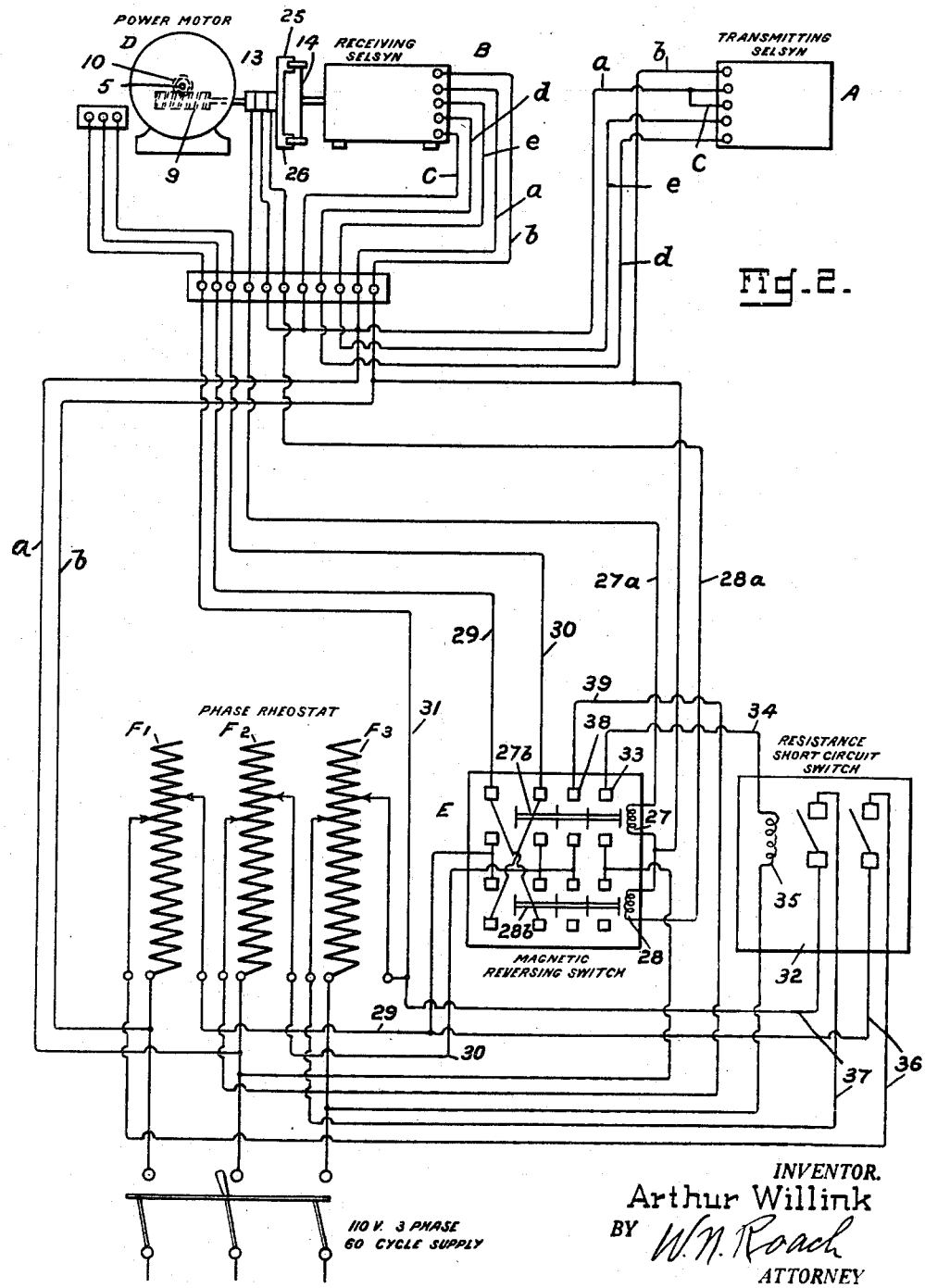

March 13, 1934.    A. WILLINK    1,950,427
CONTROL SYSTEM FOR THE TRANSMISSION OF ANGULAR MOTION
Filed April 25, 1930    3 Sheets-Sheet 3
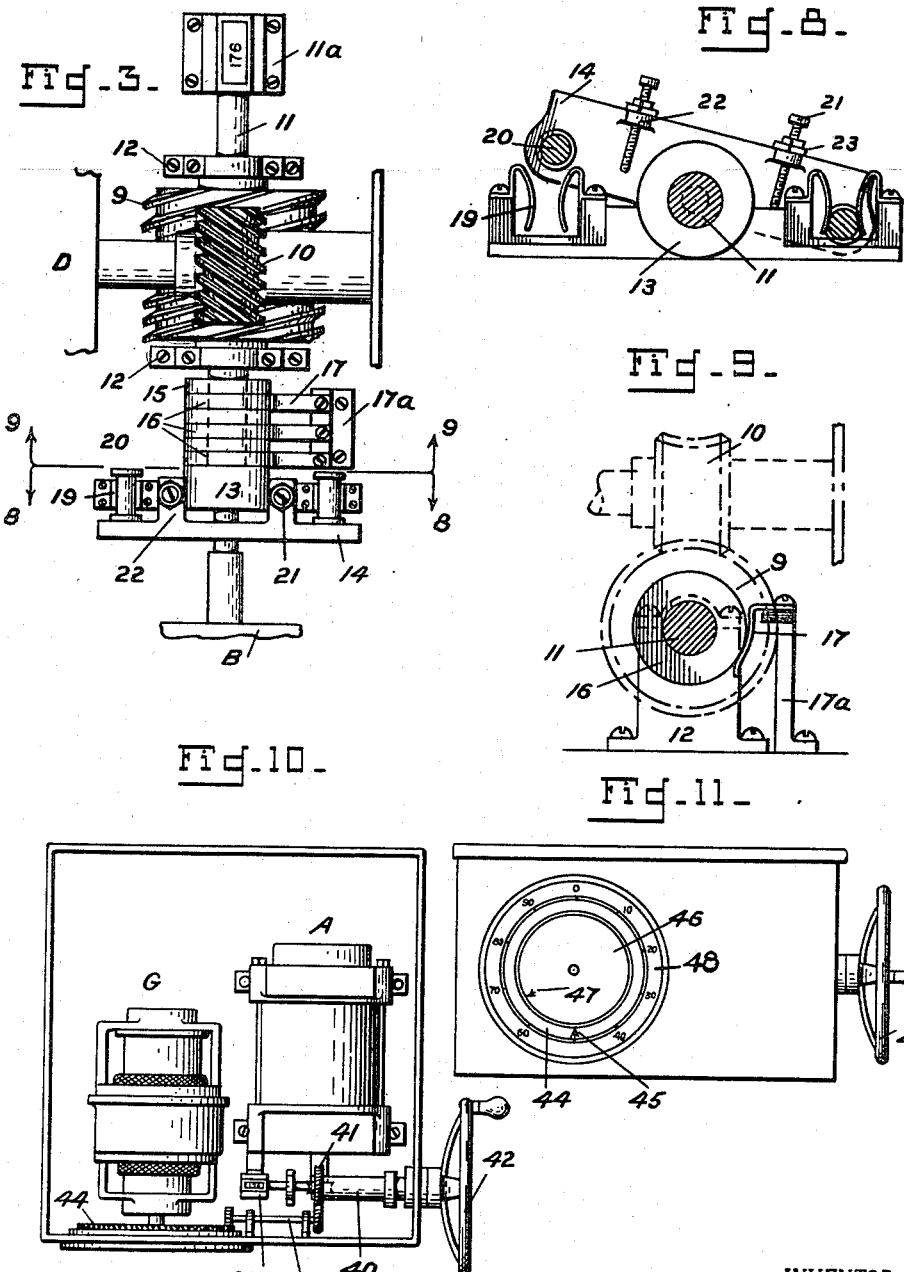
INVENTOR.
Arthur Willink
BY W. N. Roach
ATTORNEY Patented Mar. 13, 1934

1,950,427

UNITED STATES PATENT OFFICE 1,950,427

CONTROL SYSTEM FOR THE TRANSMISSION OF ANGULAR MOTION

Arthur Willink, Philadelphia, Pa.

Application April 25, 1930, Serial No. 447,391

5 Claims. (Cl. 172—239)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a control system for the transmission of angular motion and, more particularly, it has reference to a system where a member is automatically maintained in a predetermined angular relation with respect to a remote directing unit.

The member is moved by a power shaft which is under the control of a brake mechanism associated with a self-synchronous system of transmitting the measure of angular motion that is to be applied.

The invention is characterized by a novel arrangement of gear brake for the power shaft; by an electric switch designed to give proper direction to the torque applied to the power motor, to constitute a mechanical coupling between the Selsyn receiving motor and the gear brake and to act as a governor when the power motor attempts to go too fast; by the provision of a revolution counter on the shafts of the Selsyn motors for the purpose of facilitating resynchronization; by an installation whereby different torque may be applied to the power motor dependent on the direction of its rotation.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a gun equipped with the improved control system;

Fig. 2 is a diagrammatic representation of the control system;

Fig. 3 is a plan view of the gear brake;

Fig. 4 is a detailed view in rear elevation of one element of the rotary control switch at the gear brake;

Fig. 5 is a plan view thereof;

Figs. 6 and 7 are, respectively, views in plan and elevation of the other member of the control switch;

Figs. 8 and 9 are detail sectional views on the respective lines of Fig. 3;

Figs. 10 and 11 are, respectively, views in plan and side elevation of one form of control for the transmitter motor.

Referring to the drawings by characters of reference:

In Figs. 1 and 2 a self-synchronous system (known commercially as a Selsyn system) for the transmission of angular motion consists of a remotely situated transmitting motor A and a receiving motor B placed in the vicinity of a member whose movements are to be controlled, in the present instance, this member being a gun C. The Selsyn system includes two power conductors $a$ and $b$ and three control conductors $c$, $d$ and $e$, (one of which is duplexed) which connect the three windings of the rotors of the transmitter and receiver motors through suitable slip rings. The gun is actuated by an electric power motor D capable without overheating of delivering a certain specified torque when stalled with the power on. In Fig. 1 the power shaft 5 leads to the elevating arc 6, through irreversible worm gear train 7 including a wheel 8 providing for manual operation.

The receiver motor B is positioned adjacent the power motor D with its axis at right angles thereto. It controls a mechanical friction brake for the power shaft 5, the specific arrangement comprising a worm 9 meshing with a worm wheel 10 on the power shaft. The reversible type of worm gearing is preferred as it enables the power motor D to take up all the friction in the Selsyn system, consequently rendering it possible to turn the transmitter A with practically zero torque. This type of gearing also possesses the inherent advantage of permitting the power shaft to be directly connected to the gun without the use of a clutch, thereby providing for manual operation of the handwheel 8 in case the electric power fails. The irreversible type of worm gearing, however, has one favorable feature in that variations in the frictional torque or the opposing torque at the gun will be felt less easily in the transmitter. The particular type of worm gearing to be selected will depend upon the specific application.

The shaft 11 carrying the worm 9 is journaled in brackets 12—12 and on the extremity towards the receiver motor B is a contactor 13 which is associated with a rotary switch 14 fixed to the shaft of the receiver motor. The contactor comprises a drum 15 provided with three slip rings 16 which are maintained in contact with brushes 17 mounted in a support 17a. A pair of offset arms 18—18 on one end of the drum each carries a set of spaced contacts in the form of clips 19 for receiving one of a pair of contact fingers 20 on the rotary switch 14. The actual driving connection between the switch and the contactor associated with the gear brake is constituted by a pair of screws 21—21, each carried by a projecting lug 22 on the switch and arranged to engage one of the arms 18. As seen in Fig. 8 the adjustment of the screws through lock nut 23 is made with a lag so that in driving, one of the fingers 20 will be disconnected from its contact depending on the direction of rotation to interrupt an electric circuit.

In establishing these electric circuits, the inside members of the spaced clips are connected to each other and to the central slip ring by the conductor 24—24 and the outside members are individually connected to an end slip ring by the conductors 25 and 26.

When the shaft 11 is rotated in a clock-wise direction as viewed in Fig. 8, the contact 20 will engage the spring clip 19 thereby closing the circuit through the outermost of the end slip rings 16, conductor 26, clip 19 and contact 20, conductor 24 to the central slip ring 16 (see Fig. 5). When the shaft 11 rotates in a counter clockwise direction, as viewed in Fig. 8, the other contact 20 will engage the other spring clip 19 and thereby close the circuit through the innermost end slip ring 16, conductor 25, spring clip 19 and contact 20, conductor 24 to the central slip ring 16.

The principal function of the switch is to give proper direction to the torque applied by the power motor D. To this end there is provided a magnetic reversing switch E of standard type having two coils 27 and 28 with conductors 27a and 28a leading to the end brushes of the contactor unit 13 and corresponding switches 27b and 28b, bringing four pairs of contacts together. Two conductors 29 and 30 of a three-phase supply to the motors are respectively brought through rheostats F1 and F2 through the switch E while the remaining conductor 31 is led from a third rheostat F3 direct to the power motor.

As a consequence, when the control switch 14 energizes the coil 27 and actuates the corresponding switch 27B, the current is thrown in the proper phase relation tending to give rotation of the power motor in the proper direction. Upon reversing the direction of rotation of the control switch the coil 28 is energized and the tendency of rotation of the power motor is reversed by reversing phase rotation.

Where, as in the case of a gun having a muzzle preponderance, it is desirable to provide a variable feature for the power motor to compensate for the greater force required to move the gun in elevation as distinguished from azimuth, the installation additionally includes means to provide for short circuiting a certain amount of resistance in the power motor, only when one coil, for example, the coil 27 is energized. This additional installation employs two pairs of the contacts of the magnetic reversing switch in association with a resistance short circuiting switch 32. One of these contacts, indicated at 33, is connected by a conductor 34 to a coil 35 whereby the switch 32 is closed. The pairs of contacts of this switch are individually connected by respective conductors 36 and 37 to the end rheostats F1 and F3 and a portion of the resistance in two phases of the supply to the power motor may be short circuited. The remaining contact 38 of the reversing switch E is connected through the conductor 39 with the center rheostat F2 which leads back to the reversing switch E through the conductor 30 and the third phase is thus short circuited.

One form of control for the Selsyn system is shown in Figs. 8 and 9. The transmitter motor A is driven through a shaft 40 and helical gears 41, a handwheel 42 being provided for turning the shaft. The shaft 40 is also geared to a shaft 43 which, in turn, is geared to a ring 44 having a pointer 45. Within this ring is a disk 46 having a pointer 47 and connected to the shaft of a Selsyn receiving motor G which is actuated through a computer or director of the type well known in the art of fire control systems for ordnance. By matching the pointer 45 with the pointer 47 the movement generated by the director is transmitted through the Selsyn system A—B to the gear brake controlling the movement imparted by the power motor D to elevate the gun.

A counting device 40a on the shaft 40 of the transmitter motor and a similar device 11a on the worm shaft 11 at the receiving motor record the net angular displacement in revolutions of the two motors and facilitate resynchronization of the Selsyn system.

The adjustment of the system is carried out in the following manner. In the case of elevation the gun is placed in the horizontal position, that is, at zero elevation. The contactor element 13 of the rotary control switch is loosened on the shaft 11 so that both it and the switch 14 are free to turn. The handwheel 42 of the transmitter is turned until the pointer 45 registers with zero of the scale 48. The counting devices 40a and 11a are also set at zero. Without disturbing the gun the contactor 13 is fixed to the shaft 11. The switch 14 is then adjusted so that within the limit of its lag it will be completely disconnected from one set of clips when in engagement with the other. By virtue of this arrangement the switch acts as a governor, preventing the power motor D from moving the gun faster than the receiving member B is driving. Any tendency on the part of the power motor to overrun will act through the worm 9 to cause the contactor 13 to move with respect to, and faster than, the switch 14, thereby changing the contact to the opposite side and resulting in a reversal of the power motor.

In operation the handwheel 42 controlling the transmitter A specifies the degree and direction of angular motion to be transmitted to the receiver motor B. The receiver motor through the rotary control switch gives the proper direction to the power motor through the magnetic switch E and drives the worm 9, controlling the power shaft of the power motor.

I claim:

1. In a control system, an electrical system of reproducing angular motion, a control operated by the reproducer of said system, a power motor, electrical connections including magnetic switches between the control and the power motor whereby the direction of rotation of the power motor is regulated, a mechanical connection including a gear brake between the control and the power shaft of the power motor whereby the rotation of said shaft is regulated, and means associated with one of the magnetic switches between the control and the power motor for short circuiting resistance in the power supply to the motor.

2. In a control system an electrical system of reproducing angular motion, an electric power motor, means including a switch operated by the reproducer of said system for regulating the direction of rotation of said power motor, means operable in one position of the switch for short circuiting resistance in the power supply to the power motor, and a mechanical engagement with the power shaft of the power motor under control of the reproducer whereby rotation of the power shaft is regulated.

3. In a control system, an electrical system of reproducing angular motion, a control operated by the reproducer of said system, a power motor, electrical connections including magnetic switches between the control and the power motor whereby the direction of rotation of the power motor is regulated, and means associated with one of the magnetic switches between the control and the power motor for short circuiting resistance in the power supply to the motor.

4. In a control system, electrical system of reproducing angular motion including a receiving motor, an electric power motor, a divided shaft for said receiving motor, elements of an electric switch on respective portions of said shaft, means under control of said switch for regulating the direction of rotation of the power motor, means under control of the direction regulating means for varying the output of the motor, and means including the receiving motor, divided shaft and switch for mechanically braking the power motor.

5. In a control system, an electrical system of reproducing angular motion including a receiving motor, a power motor, a switch under control of the receiving motor for regulating the direction of rotation of the power motor, means for varying the output of the power motor, and a mechanical connection from the receiving motor through the switch for braking the power motor.

ARTHUR WILLINK.